March 14, 1933.  D. F. KEITH  1,901,845
THERMAL SHIELD FOR THE FREEZING SPACE OF REFRIGERATION APPARATUS
Filed April 27, 1929  2 Sheets-Sheet 1
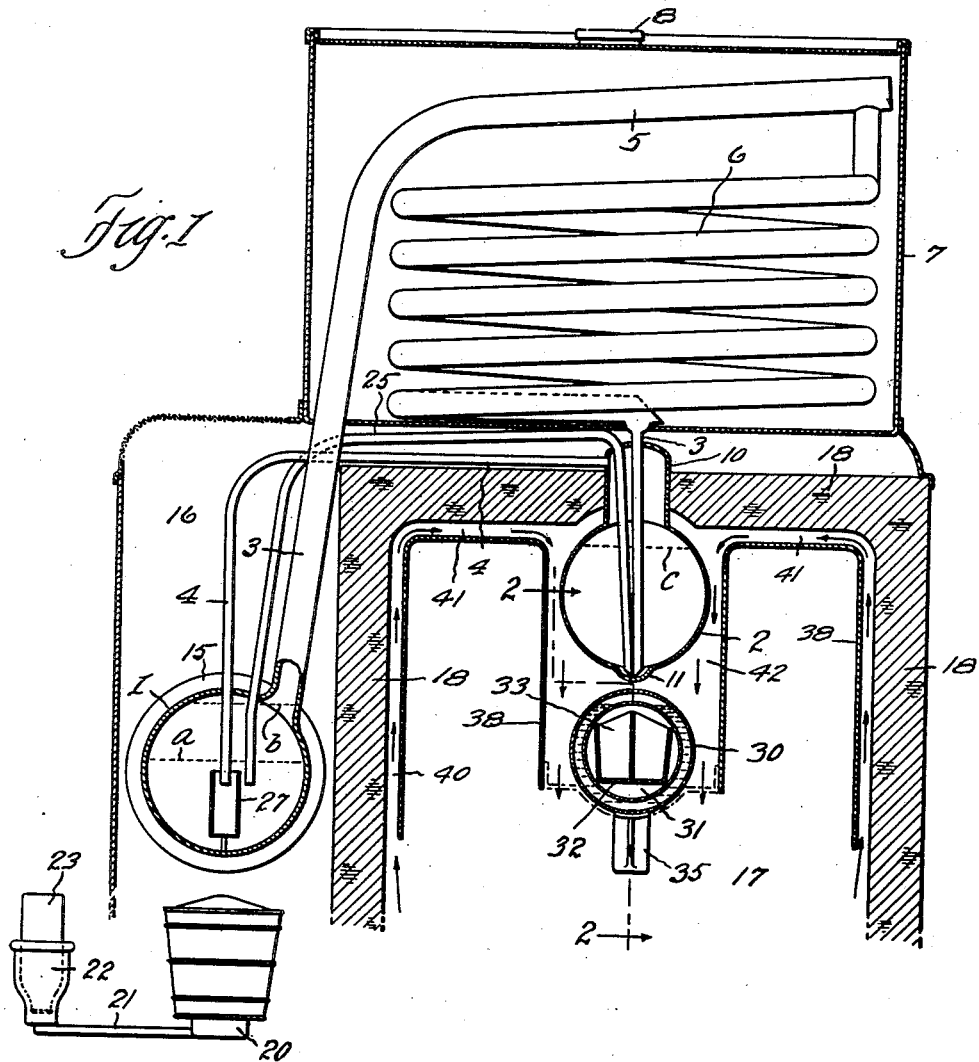
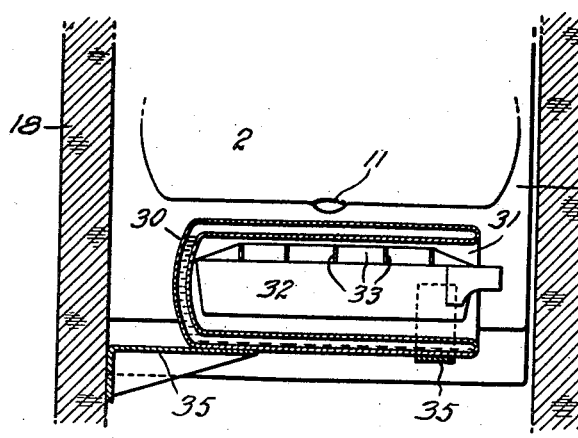

March 14, 1933. D. F. KEITH 1,901,845
THERMAL SHIELD FOR THE FREEZING SPACE OF REFRIGERATION APPARATUS
Filed April 27, 1929  2 Sheets-Sheet 2
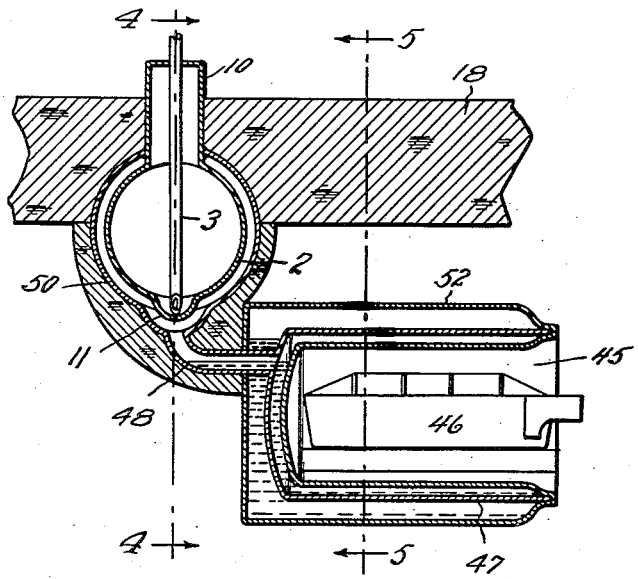
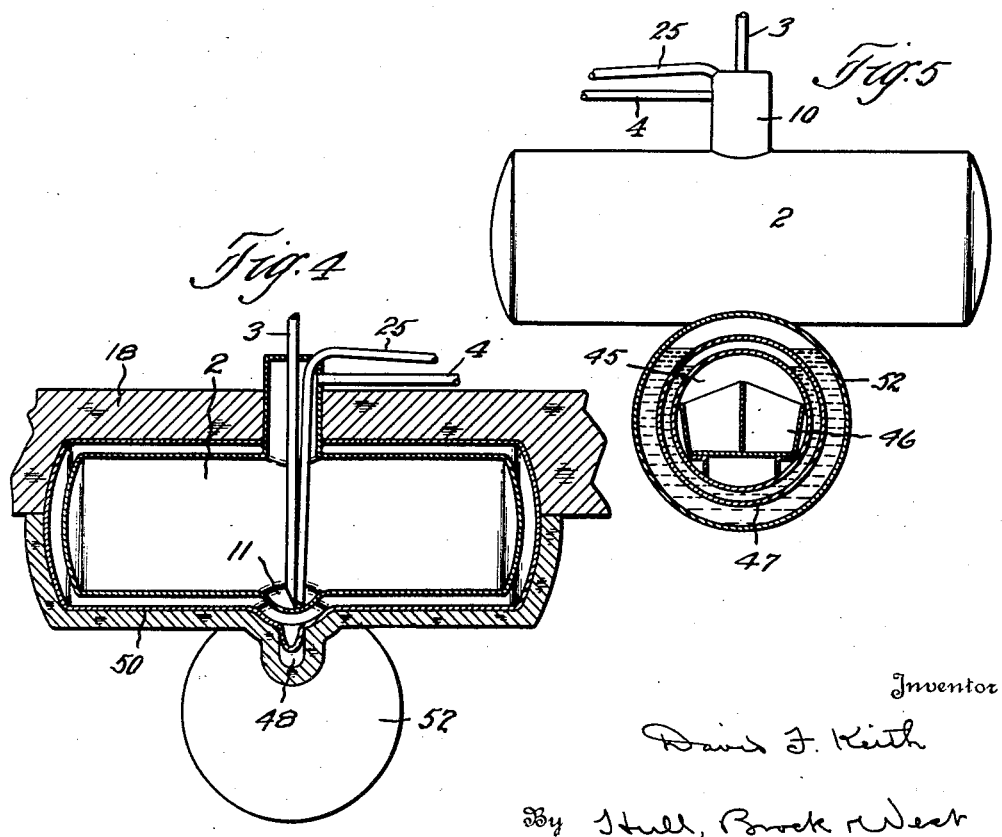

Patented Mar. 14, 1933

1,901,845

UNITED STATES PATENT OFFICE

DAVID F. KEITH, OF CLEVELAND HEIGHTS, OHIO, ASSIGNOR TO PERFECTION STOVE COMPANY, OF CLEVELAND, OHIO, A CORPORATION OF OHIO

THERMAL SHIELD FOR THE FREEZING SPACE OF REFRIGERATION APPARATUS

Application filed April 27, 1929. Serial No. 358,441.

In practically all types of refrigeration apparatus there is a space or chamber that is used for freezing ice, chilling desserts, preserving ice cream, etc., whose temperature must be maintained below a predetermined value if the same is to properly serve its purpose. While the refrigeration compartment of the apparatus—as distinguished from the freezing space or chamber—should not drop in temperature below 40 degrees, or thereabout, so as to protect vegetables, fruits, or other food stuffs placed therein, and that would be injured thereby, from freezing, great objection is raised against refrigeration apparatus whose freezing space or chamber rises in temperature at any time above the freezing point of water so that the melting of ice or the softening of other substances placed therein for preservation is detected. Also, in certain automatic types of apparatus, the mechanism is operated intermittently in response to the rise and fall in temperature of the refrigerated parts, and it is of advantage to arrange that the length of the operating periods be increased without increasing the variations in temperature of the refrigerated parts.

The objects of this invention are to provide means, in the nature of a thermal reservoir associated with the cooling unit, for preventing the temperature of the freezing space or chamber of refrigeration apparatus from rising above a predetermined value, as the freezing point of water, at any time during the cycle of operation of the apparatus or while the apparatus is in use, and which means is simple, is of small dimensions, is highly efficient, adds little to the expense of the apparatus, requires no attention, and is immune from disorder.

The invention is of especial value in connection with refrigeration apparatus of the intermittent absorption type wherein the evaporator becomes quite warm during each heating period when the relatively hot refrigerant condensate is collecting in the evaporator. An example of such a type of refrigeration apparatus will be found in my co-pending application Serial No. 242,574, filed December 27, 1927, and again in an application filed by me on the 29th day of October 1928, Serial No. 315,621, the latter case involving a unique cooling unit that I have herein shown, in a modification, combined with my present invention.

In the drawings accompanying and forming a part hereof, Fig. 1 represents a sectional elevation, somewhat in the nature of a diagram, of a refrigeration apparatus incorporating the invention; Fig. 2 is a vertical section through the receptacle containing the freezing liquid and surrounding the freezing space or chamber, the plane of section being at right angles to that of Fig. 1, and indicated generally by the line 2—2 of the first view; Fig. 3 is a sectional detail of the evaporator end of the refrigeration apparatus and wherewith is associated a modification of the invention; Fig. 4 is a section on the line 4—4 of Fig. 3, looking in the direction of the arrows associated with said line, and Fig. 5 is a section on the line 5—5 of Fig. 2, looking in the reverse direction and omitting the top wall of the refrigeration compartment and the insulation about the lower portion of the evaporator.

While, for illustrative purposes, I have shown my present invention combined with apparatus disclosed and claimed in my previously mentioned application Serial No. 242,574, it is to be understood that the present invention is not limited to such a construction. As will be obvious from the following description, it is applicable to various types of refrigeration apparatus.

Describing first, and by the use of reference characters, the refrigeration apparatus, 1 designates a generator absorber, 2 an evaporator, 3 a delivery conduit that leads from the generator absorber to the evaporator, and 4 a return conduit by which the refrigerant vapors are conducted from the evaporator to the generator absorber. Parts of the delivery conduit 3 constitute, respectively, a dehydrator 5 and a condenser 6, the former being shown as a portion of said conduit that is inclined downwardly toward the generator absorber from a point where it joins, through an abrupt drop, the inlet end of the condenser, while the latter is shown as consisting of a coiled portion of the delivery conduit. Both the dehydrator and condenser are located within a box or casing 7, shown as equipped with a filling cap 8, and adapted to permanently contain, preferably to its full capacity, a cooling agent, such as water.

The delivery conduit 3 leads downwardly through the top of a gas dome 10 that rises from the evaporator 2 and terminates adjacent the bottom of the evaporator, preferably within a sump 11 that is formed in the bottom wall of the vessel so that as long as practically any liquid is present in the evaporator it will seal said conduit against the escape of the refrigerant vapors from the evaporator through said conduit.

The generator absorber may be equipped with heat abstracting veins 15, and it may be located in a vertical flue 16. The refrigeration compartment of the apparatus is designated 17, and it is enclosed by insulated walls 18. The evaporator 2 is located in the upper portion of the refrigeration chamber and is shown as having its top portion disposed within a recess in the top wall of the chamber while the gas dome 10 is fitted through an opening in said wall.

Situated below the generator absorber is a heating device which, in the present instance, consists of an oil burner 20, preferably of the so-called wickless type, that receives fuel through a pipe 21 from a cup 22 within which is adapted to be placed, in inverted position, a font or reservoir 23. This font or reservoir is preferably of such capacity as will accommodate just enough oil to supply heat for initiating one cycle of operation of the apparatus so that after the user lights the burner he need give it no further attention as the same will go out when the limited oil supply is exhausted. Obviously, gas, electric, or other heaters may be substituted for the heating device herein shown, so far as the present invention is concerned.

A siphon 25, for returning residue liquid from the evaporator to the generator absorber at the beginning of each heating period, leads from the bottom of the evaporator up through the top of the gas dome 10, thence laterally and downwardly into the generator absorber 1. It will be noted that the return conduit 4 connects at one end with the upper portion of the gas dome 10 while its opposite end is extended downwardly through the top wall of the generator absorber and terminates within this vessel below the minimum liquid level therein, which level is indicated by the dotted line $a$. A sleeve 27 is shown as surrounding the outlet end of the return conduit and is suitably supported within the generator absorber with its lower end spaced from the bottom wall of said vessel.

The system is hermetically sealed and contains a quantity of a suitable refrigerant and an absorber therefor, such as ammonia and water, respectively. This aqua ammonia, or other equivalent mixture of refrigerant and absorber, is what is commonly referred to as the refrigerant liquor, and when all the liquor is present in the generator absorber 1 it stands at about the level indicated by the dotted line $b$.

To start the apparatus in operation a reservoir or font 23, filled with oil, is inverted within the cup 22 and the burner 20 is lighted. This initiates what is known as the heating period and it continues until the oil supply is exhausted. During the heating period, the refrigerant in the generator absorber is driven out of solution and, in the form of vapor, rises through the delivery conduit 3 and while passing through the portion of said conduit that constitutes the dehydrator designated by the reference numeral 5, all or a large percentage of the absorber vapors wherewith the refrigerant gas is saturated, condenses and flows back into the generator absorber, the refrigerant gas continuing on through the portion of the conduit that constitutes the condenser 6 and condenses therein, the resultant liquid refrigerant being collected in the evaporator 2.

At the conclusion of this phase of the operation the evaporator contains its maximum amount of liquid, the level of which is indicated by the line $c$, and this body of liquid may contain a relatively small amount of the absorbent condensate, it being practically impossible to obtain a complete dehydration of the refrigerant vapors.

The cooling period starts with the cessation of heat and it continues until the next heating period. During the heating period the pressure in the system rises to a value of from 160 to 200 pounds, the most rapid rise occurring during the early part of said period, and very soon after the heat is removed from the generator absorber the pressure within the system starts to drop abruptly. Under this descending pressure condition the liquid refrigerant in the evaporator starts to vaporize and, in the promotion of such vaporization, abstracts heat from the surrounding air. Also, under the low pressure now prevailing in the system, the absorbent in the generator absorber attracts the refrigerant gas through the return conduit 4, and as the gas escapes from the discharge end of said conduit it is instantly absorbed by the solution in the generator absorber. During the early stages of the heating period, when the pressure within the system is rising very rapidly, it tends to equalize throughout the system, and as a result thereof, forces the refrigerant liquor that is in and about the ends of the siphon tube up into the legs of the siphon and the gas that is pocketed between the separated bodies of liquid is compressed to a pressure value substantially equal to that prevailing in the remainder of the apparatus. This gas, in its compressed state, and which is refrigerant vapor, is readily absorbed by the refrigerant liquor in the ends of the siphon tube and by reason thereof tends to draw the separated bodies of liquid together. Under this and other influences the liquid assumes or approaches a state of continuity throughout the length of the siphon with the result that a siphonic action is instituted, the flow being in the direction away from the evaporator and toward the generator absorber. This siphonic action continues until the evaporator is practically emptied of the liquor.

I will now describe that which constitutes my present invention and which had its conception in the thought of placing within the refrigeration compartment, preferably adjacent to or surrounding the freezing space or chamber, a receptacle containing a liquid having a freezing point slightly below that of water, or below a predetermined temperature value above which it is desired that the temperature of the so-called freezing space or chamber shall not go, and which is, preferably, of a eutectic nature, as will hereinafter appear.

In Fig. 1 I have shown a double wall receptacle 30 that encloses, by its inner wall, a freezing space or chamber 31 for the accommodation of an ice tray or other vessel 32. This space or chamber is open at its forward end for the insertion and withdrawal of the ice tray or vessel 32, and about said open end, the inner and outer walls of the receptacle are joined together. Following common practice, the ice tray may be provided with removable partitions 33. Suitable supports are provided for the receptacle, as those designated 35. The space between the inner and outer walls of the receptacle 30 is preferably sealed and permanently contains a solution that will freeze at a temperature slightly below a predetermined temperature value, as below the freezing point of water. A solution that is found suitable is one of sodium chromate ($Na_2CrO_4$—165 grams per 1000 c. c. of solution). This is a eutectic solution that freezes and melts at a constant temperature of 23.2° F., and other eutectic solutions which may be mentioned by way of example and recommended according to the degree of low temperature it is desired to maintain are: potassium dichromate ($K_2Cr_2O_7$—45 grams per 1000 c. c. of solution) freezing and melting at a constant temperature of 30.5° F.; potassium chromate ($K_2CrO_4$—575 grams per 1000 c. c. of solution) freezing and melting at a constant temperature of 11.5° F.; and sodium hydroxide (NaOH—244 grams per 1000 c. c.) freezing and melting at a subzero temperature of 7° F. The latter, by reason of its low melting point, is especially suitable for use in refrigeration apparatus employed as ice cream cabinets. All of these solutions are found to be non-corrosive to steel and the eutectic solutions have the advantage over ordinary solutions of maintaining a constant temperature during freezing and melting. Ordinary solutions, on the other hand, tend to a progressive lowering of the freezing point during freezing because of the well known principle that the water of the solution separates as it crystallizes into more or less pure ice, thereby constantly increasing the concentration of the remaining solution.

Arranged on opposite sides of the evaporator 2 and receptacle 30, and spaced from the side and top walls of the refrigeration compartment, are partitions or deflectors 38 that define vertical passageways 40 adjacent the side walls, horizontal passageways 41 beneath the top wall, and a passageway 42 that is occupied by the evaporator and receptacle.

During the cooling period, when the refrigerant is vaporizing within the evaporator and extracting heat from the surrounding air, the air thus made cold descends about the receptacle 30 to the lower portion of the refrigeration compartment, displacing the warmer air which flows up through the passageways 40 and across through the passageways 41 into the passageway 42 where it, in turn, is chilled and descends through the passageway 42 about the receptacle 30 into the main portion of the refrigeration compartment, this circulation of the air keeping up throughout the cooling period. The heat interchange between the air and contents of the receptacle 30 and tray or vessel 32 is, of course, such as will cause said contents to freeze.

During the heating period, when the relatively hot refrigerant condensate is accumulating in the evaporator, the evaporator becomes warm and warms up the air surrounding it. This warm air rises to the top of the refrigeration compartment and lies dormant within the upper portions of the aforesaid passageways, while the cold air remains practically undisturbed in the main portion of the refrigeration compartment below the plane of the evaporator. On account of this condition, the effect of the evaporators' warmth on the contents of the receptacle 30 is minimized, and although it may be sufficient to melt the frozen solution in said receptacle, it cannot affect the ice or other substance in the ice tray or vessel 32 until said solution has become entirely melted. Since it is my intention to use such volume of the solution that the same, when frozen, will not become entirely melted during a heating period, it will be readily seen that the ice or other substance in the tray or vessel 32 will remain solid at all times.

In the modification illustrated in Figs. 3 to 5, I have combined my present invention with the cooling vessel that constitutes the subject matter of my application Serial No. 315,621, hereinbefore mentioned. In this embodiment, the freezing space or chamber 45, that accommodates an ice tray or vessel 46, is enclosed by a double wall cylinder 47 whose interior communicates, through a conduit 48, with a shell 50 that surrounds the evaporator 2. The space between the inner and outer walls of the cylinder 47 contains a volatile liquid and, during the cooling period, the vapors of said liquid condense on the wall of the evaporator 2 and drip to the bottom of the shell 50 and drain back into the body of said liquid. This condensation of the vapors causes the pressure within the enclosure consisting of the double wall cylinder 47, the conduit 48 and the shell 50, to drop with a consequential lowering of the boiling point of the liquid so that, under the influence of its relatively warm environments, the liquid will continue to vaporize or boil, and its vapors to condense upon the evaporator 2, so that during the cooling period, when the refrigerant in the evaporator 2 is vaporizing, a similar action is going on in the aforesaid enclosure, effecting a heat interchange between the volatile liquid therein and the interior and surroundings of the cylinder 47.

During the heating period, when the relatively hot refrigerant condensate is collecting in the evaporator 2, the evaporator is at a higher temperature than the vapors of the liquid in the enclosure and consequently no condensation will occur and there will be no appreciable action taking place in said enclosure. Consequently there will be little heat interchange between the contents of the cylinder 47 and its surroundings. For a fuller description of this element of the combination, reference may be had to my application last referred to.

A receptacle 52, corresponding to the receptacle 30 of the previous form of the invention, surrounds the cylinder 47 and contains a liquid that, as in the former case, freezes at a temperature slightly below the freezing point of water or below a predetermined temperature value above which it is desired that the temperature of the freezing space or chamber shall not go. The contents of the receptacle 52 will become frozen during the cooling period, as in the former case, and this is very effectively attained in the present construction in view of the intimate contact of the contents of said receptacle with the cooling vessel or cylinder 47; and during the heating period, any heat that may be transmitted to the liquid in the double wall cylinder 47 will be absorbed by the frozen contents of the receptacle which will have to become entirely melted before the warmth of the volatile liquid can have any effect upon the contents of the freezing space or chamber.

Having thus described my invention, what I claim is:—

1. In refrigeration apparatus, in combination with a structure enclosing a refrigeration compartment, a cooling unit situated within said compartment, a holder for a substance whose temperature is to be reduced to or maintained at a substantially given value by heat interchange with said unit, a double wall receptacle spaced from the cooling unit and whose inner wall encloses said holder, and a liquid in the space between the inner and outer walls of the receptacle whose freezing point is below the said given temperature value and above the lowest temperature of the cooling unit.

2. In refrigeration apparatus whose refrigeration compartment includes a passageway that opens at its opposite ends into the main portion of the compartment, the cooling unit of the apparatus being located within said passageway and is so disposed with respect thereto as to induce a thermo-siphon circulation of air through the passageway and there being a so-called freezing space in heat exchanging relation to said unit, a receptacle situated below the plane of the cooling unit so as to be subjected therewith to the circulation of air through the passageway, said receptacle being adjacent said freezing space, and a liquid in said receptacle whose freezing point is below a temperature value above which it is desired the temperature of said freezing space shall not go.

3. In refrigeration apparatus, a member in the refrigeration compartment of said apparatus defining a passageway that opens at both ends into the main portion of said compartment, the cooling unit of the apparatus being situated in said passageway and is so disposed with respect thereto as to induce a thermo-siphon circulation of air through the passageway, there being a so-called freezing space in heat exchanging relation to the cooling unit, a receptacle that is also in heat exchanging relation to the cooling unit and upon which the cooling influence of the cooling unit is imposed by the thermo-siphon circulation of the air, and a liquid in said receptacle whose freezing point is below a temperature value above which it is desired the temperature of said freezing space shall not go.

4. In refrigeration apparatus, a member within the refrigeration compartment thereof which, with a portion of the walls of said compartment, defines a passageway that opens at both ends into the main portion of the compartment, the cooling unit of the apparatus being located in said passageway and is so disposed with respect thereto as to induce a thermo-siphon circulation of air through the passageway, a receptacle situated below the cooling unit so as to be subjected therewith to the circulation of air through the passageway and enclosing a so-called freezing chamber, the receptacle having a liquid containing space, and a liquid in said space whose freezing point is below a temperature value above which it is desired the temperature of the freezing chamber shall not go.

5. In refrigeration apparatus, a pair of deflectors spaced apart within the upper portion of the refrigeration compartment of said apparatus and defining with the side and top walls of said compartment passageways leading up along the side walls and across beneath the top wall where they join and extend downwardly into the main portion of the compartment, the cooling unit of the apparatus being situated within the joint passageway between the upper portions of said deflectors, and a double wall receptacle in the passageway below the cooling unit and whose inner wall encloses a so-called freezing chamber, and a liquid within the space between said walls whose freezing point is below a temperature value above which it is desired the temperature of said chamber shall not go.

6. In refrigeration apparatus, in combination with the evaporator, of a vessel in heat exchanging relation to a so-called freezing space and containing a volatile liquid, said vessel being so arranged with respect to the evaporator that the vapors of said liquid are subjected to and under some conditions condensed by the temperature of the evaporator, a receptacle in heat exchanging relation to the vessel, and a liquid in said receptacle whose freezing point is below a temperature value above which it is desired the temperature of said freezing space shall not go.

7. In refrigeration apparatus, the combination with the evaporator, of a cooling vessel containing a volatile liquid, said vessel being so arranged with respect to the evaporator that the vapors of said liquid are subjected to the temperature of the evaporator for condensation thereby, a holder for a substance whose temperature is to be reduced to or maintained at a substantially given value by heat interchange with said cooling vessel, a receptacle in heat exchanging relation to said vessel, and a liquid in said receptacle whose freezing point is below the said given temperature value.

8. In refrigeration apparatus, in combination with the evaporator, a double wall vessel whose inner wall encloses a so-called freezing chamber, said vessel containing a volatile liquid, communicating means through which the vapors of said liquid are subjected to the temperature changes of the evaporator, a receptacle surrounding the vessel, and a liquid in said receptacle whose freezing point is below a temperature value above which it is desired the temperature of said chamber shall not go.

9. In refrigeration apparatus, in combination with a structure enclosing a refrigeration compartment, a cooling unit within said compartment in direct heat exchanging relation thereto, a holder for a substance whose temperature is to be reduced to or maintained at a substantially given value by heat interchange with said unit, a receptacle in heat exchanging relation to the unit and so disposed as to shield the holder from the temperature of the aforesaid compartment, and a liquid in said receptacle whose freezing point is below the said given temperature value and above the lowest temperature of the cooling unit.

10. In refrigeration apparatus, in combination with a structure enclosing a refrigeration compartment, a cooling unit within said compartment in direct heat exchanging relation thereto, an ice tray and a receptacle both in heat exchanging relation to the cooling unit while the receptacle is so disposed as to shield the ice tray from the temperature of the refrigeration compartment, and a liquid in said receptacle whose freezing point is below that of water and above the lowest temperature of the cooling unit.

In testimony whereof, I hereunto affix my signature.

DAVID F. KEITH.